(12) United States Patent
Chen (10) Patent No.: US 11,325,780 B2
(45) Date of Patent: May 10, 2022

(54) METHOD AND DEVICE FOR SORTING CARGO

(71) Applicant: Beijing Jingdong Zhenshi Information Technology Co., Ltd., Beijing (CN)

(72) Inventor: Kun Chen, Beijing (CN)

(73) Assignee: Beijing Jingdong Zhenshi Information Technology Co., Ltd, Beijing (CN)

( * ) Notice: Subject to any disclaimer, the term of this patent is extended or adjusted under 35 U.S.C. 154(b) by 185 days.

(21) Appl. No.: 16/636,047

(22) PCT Filed: Apr. 11, 2018

(86) PCT No.: PCT/CN2018/082687
§ 371 (c)(1),
(2) Date: Feb. 3, 2020

(87) PCT Pub. No.: WO2019/047523
PCT Pub. Date: Mar. 14, 2019

(65) Prior Publication Data
US 2020/0239234 A1    Jul. 30, 2020

(30) Foreign Application Priority Data
Sep. 7, 2017 (CN) .......................... 201710799055.7

(51) Int. Cl.
G06F 7/00 (2006.01)
B65G 1/137 (2006.01)
G06Q 10/08 (2012.01)

(52) U.S. Cl.
CPC ......... *B65G 1/1373* (2013.01); *G06Q 10/087* (2013.01)

(58) Field of Classification Search
USPC ................................ 700/213–216, 223, 228
See application file for complete search history.

(56) References Cited

U.S. PATENT DOCUMENTS

| 4,835,702 A | * | 5/1989 | Tanaka | B65G 1/1378 |
| | | | | 700/223 |
| 2009/0112675 A1 | | 4/2009 | Servais | |
| 2014/0303768 A1 | | 10/2014 | Klumpp et al. | |

FOREIGN PATENT DOCUMENTS

| CN | 103679417 A | 3/2014 |
| CN | 10475272 A | 7/2015 |
| CN | 104751272 A | 7/2015 |
| CN | 105858045 A | 8/2016 |

(Continued)

*Primary Examiner* — Yolanda R Cumbess
(74) *Attorney, Agent, or Firm* — Dinsmore & Shohl LLP (57) ABSTRACT

A method and a device for sorting cargo. The method includes: acquiring a to-be-allocated order; determining, for each target sorting unit, at least one of: a number of to-be-sorted orders of the target sorting unit, a number of types of to-be-sorted cargo, or a coincidence number of types of cargo between the target sorting unit and the to-be-allocated order; selecting a target sorting unit based on at least one of following items of each target sorting unit: the number to-be-sorted orders, the number of types of to-be-sorted cargo, or the coincidence number of types of cargo; and allocating the to-be-allocated order to the selected target sorting unit, such that the selected target sorting unit sorts out the cargo indicated by the to-be-allocated order.

17 Claims, 6 Drawing Sheets

(56) References Cited

FOREIGN PATENT DOCUMENTS

| | | | |
|---|---|---|---|
| CN | 106185152 | A | 12/2016 |
| CN | 106892233 | A | 6/2017 |
| CN | 106897852 | A | 6/2017 |
| CN | 106934580 | A | 7/2017 |
| CN | 107025533 | A | 8/2017 |
| CN | 107089464 | A | 8/2017 |

* cited by examiner

METHOD AND DEVICE FOR SORTING CARGO

CROSS-REFERENCE TO RELATED APPLICATIONS

The present patent application is a U.S. National Stage of International Application No. PCT/CN2018/082687, which claims priority to Chinese Patent Application No. 201710799055.7, filed on Sep. 7, 2017 by the applicants BEIJING JINGDONG SHANGKE INFORMATION TECHNOLOGY CO., LTD., and BEIJING JINGDONG CENTURY TRADING CO., LTD., and entitled "METHOD AND DEVICE FOR SORTING CARGO," the entire contents of which are herein incorporated by reference.

TECHNICAL FIELD

The present disclosure relates to the field of computer technology, specifically to the field of warehouse logistics technology, and more specifically to a method and apparatus for sorting cargo.

BACKGROUND

With the continuous development of e-commerce, the warehouse logistics technology also appears to be particularly important. In the case where there is a huge amount of orders, how to quickly sort out cargo indicated by an order from a warehouse is a technical problem involved in the warehouse logistics technology.

Conventional cargo sorting approach generally is to allocate orders to a sorting unit with a minimum number of order forms to be sorted. However, this approach has a problem of low sorting efficiency.

SUMMARY

Embodiments of the present disclosure are directed to provide an improved method and apparatus for sorting cargo so as to solve a part of the technical problems mentioned in the background portion.

In a first aspect, an embodiment of the present disclosure provides a method for sorting cargo, including: acquiring an order form to be allocated; determining, for each target sorting unit of a plurality of target sorting units, at least one of following items: a number of order forms to be sorted of the target sorting unit, a number of types of cargo to be sorted, or a coincidence number of types of cargo between types of cargo to be sorted of the target sorting unit and types of cargo indicated by the order form to be allocated, the coincidence number of types of cargo being a number of same types of cargo between the types of cargo indicated by the order form to be allocated and the types of cargo to be sorted of the target sorting unit; selecting a target sorting unit based on at least one of following items of each target sorting unit: the number of order forms to be sorted, the number of types of cargo to be sorted, or the coincidence number of types of cargo; and allocating the order form to be allocated to the selected target sorting unit, such that the selected target sorting unit sorts out the cargo indicated by the order form to be allocated.

In a second aspect, an embodiment of the present disclosure provides an apparatus for sorting cargo, including: an acquiring unit configured to acquire an order form to be allocated; a determining unit configured to determine, for each target sorting unit of a plurality of target sorting units, at least one of following items: a number of order forms to be sorted of the target sorting unit, a number of types of cargo to be sorted, or a coincidence number of types of cargo between the types of cargo to be sorted of the target sorting unit and the types of cargo indicated by the order form to be allocated, the coincidence number of types of cargo being a number of same types of cargo between the types of cargo indicated by the order form to be allocated and the types of cargo to be sorted of the target sorting unit; a selecting unit configured to select a target sorting unit based on at least one of following items of each target sorting unit: the number of order forms to be sorted, the number of types of cargo to be sorted, or the coincidence number of types of cargo; and an allocating unit configured to allocate the order form to be allocated to the selected target sorting unit, such that the selected target sorting unit sorts out the cargo indicated by the order form to be allocated.

In a third aspect, an embodiment of the present disclosure provides a device, including: one or more processors; and a storage apparatus configured to store one or more programs, where the one or more programs, when executed by the one or more processors, cause the one or more processors to implement the method according to the first aspect.

In a fourth aspect, an embodiment of the present disclosure provides a computer readable storage medium, storing a computer program thereon, where the program, when executed by a processor, implements the method according to the first aspect.

The method and apparatus provided by the embodiments of the present disclosure analyzes an existing order form to be sorted of the target sorting unit, and selects a target sorting unit executing an order form to be allocated based on some related information of the order form to be sorted of each target sorting unit. The selected target sorting unit sorts the cargo indicated by the order form to be allocated, thus improving the cargo sorting efficiency.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described below in detail with reference to the accompanying drawings and in combination with the embodiments.

Figure 1:
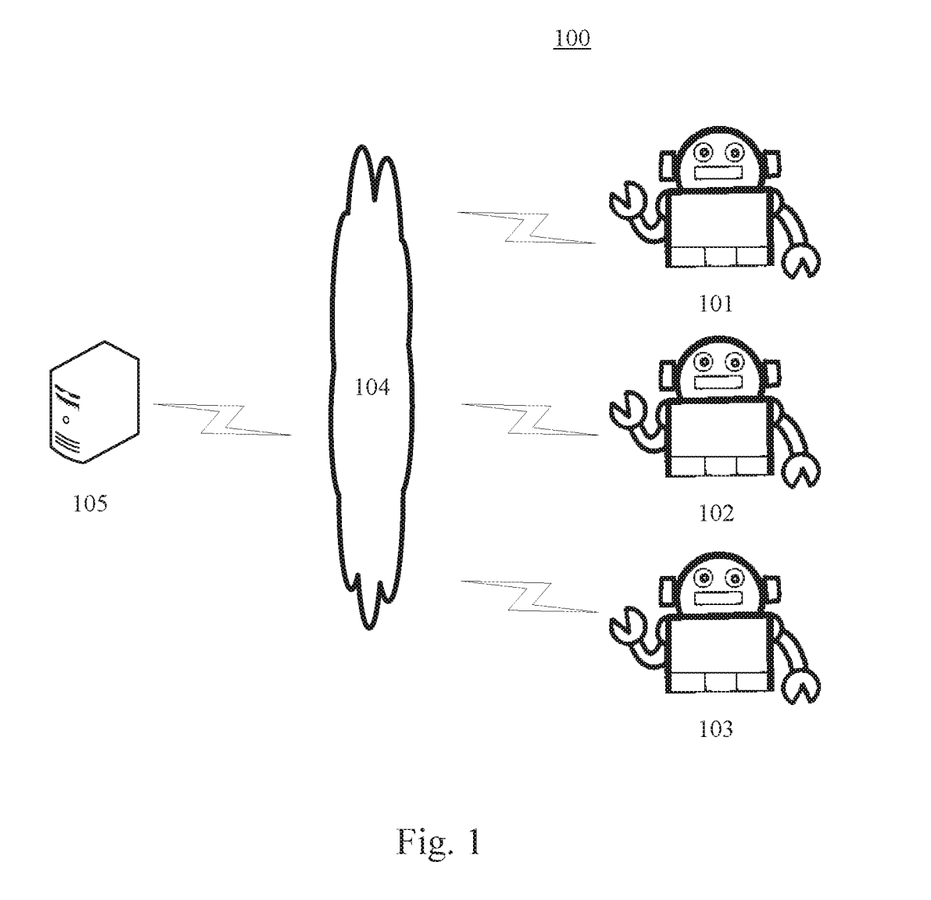
FIG. 1 is a diagram of an example system architecture in which embodiments of the present disclosure may be implemented.

FIG. 1 shows an example system architecture 100 in which a method for sorting cargo or an apparatus for sorting cargo of embodiments of the present disclosure may be implemented.

As shown in FIG. 1, the system architecture 100 may include sorting units 101, 102 and 103, a network 104, and an order allocation server 105. The network 104 serves as a medium providing a communication link between the sorting units 101, 102 and 103, and the order allocation server 105. The network 104 may include various types of connections, such as wired or wireless communication links, or optical cables.

The sorting units 101, 102, and 103 may interact with the order allocation server 105 via the network 104, for example, to receive or send a message. For example, the sorting unit may send related information of an order form to be sorted to the order allocation server. The order form to be sorted is an order which is allocated to a sorting device, but sorting of which is not completed by the sorting device.

The sorting units 101, 102, and 103 may alternatively control the sorting device to sort out cargo indicated by the order form to be sorted. As an example, the sorting unit may be a robot for sorting cargo.

The order allocation server 105 may be a server providing various services, for example, an order allocation server that may receive a new order, analyze the new order and the order form to be sorted, and allocate the new order to the sorting unit. The order allocation server may process, e.g., analyze, related data of the received new order, and return the processing result (e.g., a new order allocated to the sorting unit) to the sorting unit.

It should be noted that the method for sorting cargo provided by some embodiments of the present disclosure is generally executed by the order allocation server 105. Accordingly, the apparatus for sorting cargo is generally provided in the order allocation server 105.

It should be understood that the numbers of sorting units, networks, and order allocation servers in FIG. 1 are merely illustrative. Any number of sorting units, networks, and order allocation servers may be provided based on actual requirements.

Figure 2:
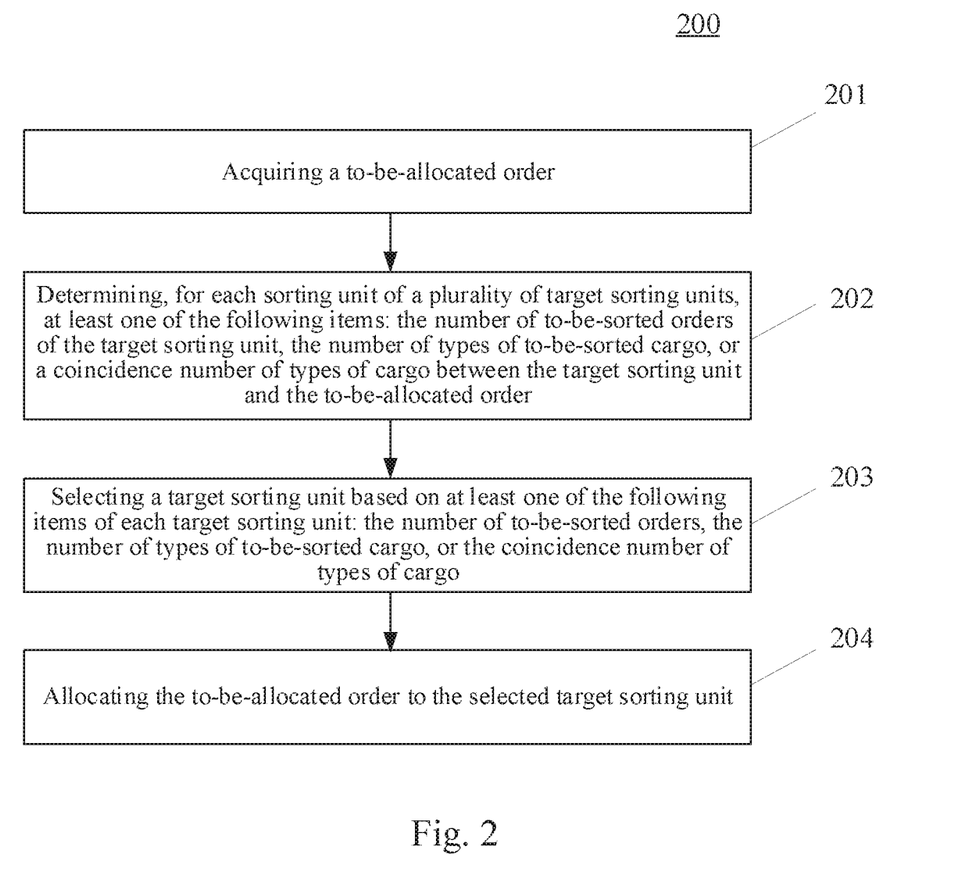
FIG. 2 is a flowchart of a method for sorting cargo according to an embodiment of the present disclosure.

Further referring to FIG. 2, a process 200 of a method for sorting cargo according to an embodiment of the present disclosure is shown. The method for sorting cargo includes the following steps.

Step 201: acquiring an order form to be allocated.

In the present embodiment, an electronic device (e.g., the order allocation server shown in FIG. 1) on which the method for sorting cargo runs may acquire the order form to be allocated locally or from other electronic devices.

Generally, a user may submit a new order to an order processing server, the order processing server may determine from which warehouse cargo indicated by the order are sorted out, and then, the order processing server may send this order to an order allocation server of the determined warehouse. It should be noted that the order processing server and the order allocation server may be a given electronic device.

In the present embodiment, there may be one or more order forms to be allocated.

In some alternative implementations of the present embodiment, the order form to be allocated may be determined by the following approach: acquiring to-be-processed order information of an order form to be processed. Here, the to-be-processed order information may include priority information and time information. Whether to determine the to-be-processed order for use as the order form to be allocated is determined based on the priority information, and whether a time interval between time indicated by the time information and current time is greater than a preset duration threshold.

As an example, whether to determine the above to-be-processed order for use as the order form to be allocated may be determined based on the priority information. In response to determining failure to determine the above to-be-processed order form for use as the order form to be allocated, whether the time interval between the above time and the current time is greater than the preset duration threshold is determined. In response to determining that the time interval is greater than the preset duration threshold, the to-be-processed order is determined for use as the order form to be allocated.

As an example, the priority information may include information indicating whether an order is an emergency order or a common order, and the emergency order may be determined for use as the order form to be allocated based on the priority information. For a common order, in response to that a time interval between time (which may be order placing time, or order receiving time) indicated by time information of the common order and current time is greater than the preset duration threshold, the common order is determined for use as the order form to be allocated. It can be understood that if the time interval between the time indicated by the time information of the common order and the current time is greater than the preset duration threshold, then the to-be-processed order may be placed for a long time, and should be allocated as soon as possible. Otherwise, cargo delivery of the order may be delayed.

Step 202: determining, for each target sorting unit of a plurality of target sorting units, at least one of the following items: the number of order forms to be sorted of the target sorting unit, the number of types of cargo to be sorted, or the coincidence number of types of cargo between the types of cargo to be sorted of target sorting unit and the types of cargo indicated by the order form to be allocated.

In the present embodiment, the electronic device (e.g., the order allocation server shown in FIG. 1) on which the method for sorting cargo runs may determine at least one of the following items, for each target sorting unit of the plurality of target sorting units: the number of order forms to be sorted of the target sorting unit, the number of types of cargo to be sorted, or the coincidence number of types of cargo between the target sorting unit and the order form to be allocated.

In the present embodiment, the target sorting unit may be a unit capable of completing a task of sorting cargo indicated by an order. Each target sorting unit may sort cargo indicated by one or more orders.

In some alternative implementations of the present embodiment, the above target sorting unit may include a movable sorting robot. The sorting robot is movable in the warehouse, a plurality of cargo shelves is placed in the warehouse, and the sorting robot may sort cargo from the cargo shelves.

In some alternative implementations of the present embodiment, the above target sorting unit may include a sorting robot for sorting in situ, and the cargo shelves in the warehouse may be transferred by a transfer robot to a place close to the sorting robot for sorting in situ, such that the sorting robot for sorting in situ sorts out desired cargo in an order form to be sorted from the cargo shelves.

In some alternative implementations of the present embodiment, the target sorting unit may include various cargo sorting tools operated by sorting personnel, for example, may include, but is not limited to, a small forklift running in the warehouse, and a container for accommodating sorted cargo.

It can be understood that the target sorting unit may complete sorting orders allocated to the target sorting unit, or may not complete sorting the orders. If an order is allocated to the target sorting unit, but the target sorting unit does not complete sorting the order, then the order may be referred to as an order form to be sorted of the target sorting unit.

In the present embodiment, the number of order forms to be sorted and the number of types of cargo to be sorted may be determined based on order forms to be sorted which are allocated to the target sorting unit, but sorting of which is not completed by the target sorting unit.

It should be noted that a type of cargo may be pre-classified based on practical experience. As an example, shampoo and shower gel may be classified into a category of daily necessities; or shampoos of all brands may be classified into a category of shampoo; or shampoos of different brands may be classified as different categories of shampoos.

It should be noted that, the type of cargo may be obtained based on a cargo identifier. As an example, whether the cargo are of a given category may be distinguished based on a Stock Keeping Unit (SKU) of the cargo. If the SKUs are identical, then the cargo are of the given category, while if the SKUs are different, then the cargo are of different categories.

In the present embodiment, the coincidence number of types of cargo is the number of same types of cargo between the types of cargo indicated by the order form to be allocated and the types of cargo to be sorted of the target sorting unit.

As an example, an order form to be allocated indicates two types of cargo, which are shampoo and shower gel respectively. An order form to be sorted of a target sorting unit A indicates three types of cargo, which are shampoo, shower gel, and biscuit respectively, and the same types of cargo of the order form to be allocated and the target sorting unit A are shampoo and shower gel. An order form to be sorted of a target sorting unit B indicates two types of cargo, which are shower gel and biscuit respectively, and the same type of cargo of the order form to be allocated and the target sorting unit B is shower gel. Therefore, it may be concluded that the coincidence number of types of cargo of the order form to be allocated and the target sorting unit A is two, and the coincidence number of types of cargo of the order form to be allocated and the target sorting unit B is one.

Step 203: selecting a target sorting unit based on at least one of the following items of each target sorting unit: the number of order forms to be sorted, the number of types of cargo to be sorted, or the coincidence number of types of cargo.

In the present embodiment, the electronic device (e.g., the order allocation server shown in FIG. 1) on which the method for sorting cargo runs may select the target sorting unit based on at least one of the following items of each target sorting unit: the number of order forms to be sorted, the number of types of cargo to be sorted, or the coincidence number of types of cargo.

In some alternative implementations of the present embodiment, step 203 may be implemented as follows: searching and selecting a target sorting unit with a minimum number of order forms to be sorted.

In some alternative implementations of the present embodiment, step 203 may be implemented as follows: searching and selecting a target sorting unit with a maximum coincidence number of types of cargo.

Step 204: allocating the order form to be allocated to the selected target sorting unit.

In the present embodiment, the electronic device (e.g., the order allocation server shown in FIG. 1) on which the method for sorting cargo runs may allocate the order form to be allocated to the selected target sorting unit, such that the selected target sorting unit sorts out the cargo indicated by the order form to be allocated.

Figure 3:
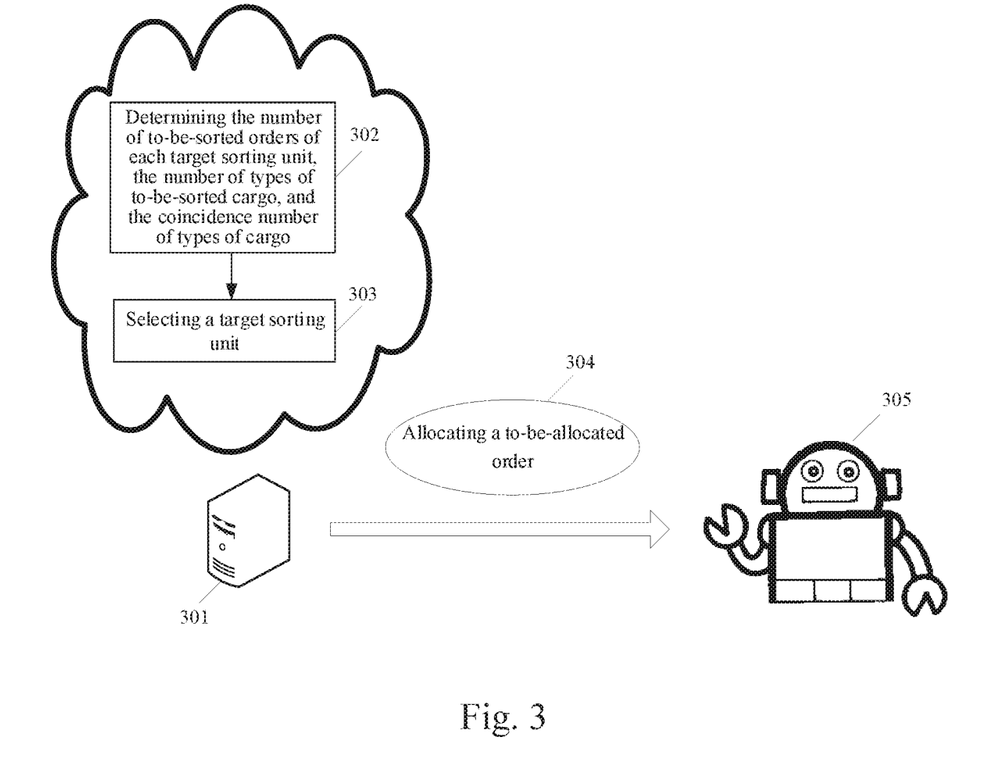
FIG. 3 is a schematic diagram of an application scenario of the method for sorting cargo according to an embodiment of the present disclosure.

Further referring to FIG. 3, FIG. 3 is a schematic diagram of an application scenario of the method for sorting cargo according to an embodiment. In the application scenario of FIG. 3, an order allocation server 301 may first acquire an order form to be allocated; then, the order allocation server may determine, for each target sorting unit of a plurality of target sorting units, at least one of the following items: the number of order forms to be sorted of the target sorting unit, the number of types of cargo to be sorted, or the coincidence number of types of cargo between the types of cargo to be sorted of the target sorting unit and the types of cargo indicated by the order form to be allocated, as shown in 302 of FIG. 3; then, the order allocation server may select the target sorting unit based on at least one of the following items of each target sorting unit: the number of order forms to be sorted, the number of types of cargo to be sorted, or the coincidence number of types of cargo, as shown in 303 of FIG. 3; then, the order allocation server may allocate the order form to be allocated to the selected target sorting unit 305, as shown in 304 of FIG. 3; and finally, the selected target sorting unit 305 may sort out the cargo indicated by the order form to be allocated.

The method provided by the above embodiments of the present disclosure analyzes an existing order form to be sorted of the target sorting unit, and selects a target sorting unit executing an order form to be allocated based on some related information of the order form to be sorted of each target sorting unit. The selected target sorting unit sorts the cargo indicated by the order form to be allocated, thus improving the cargo sorting efficiency.

Figure 4A:
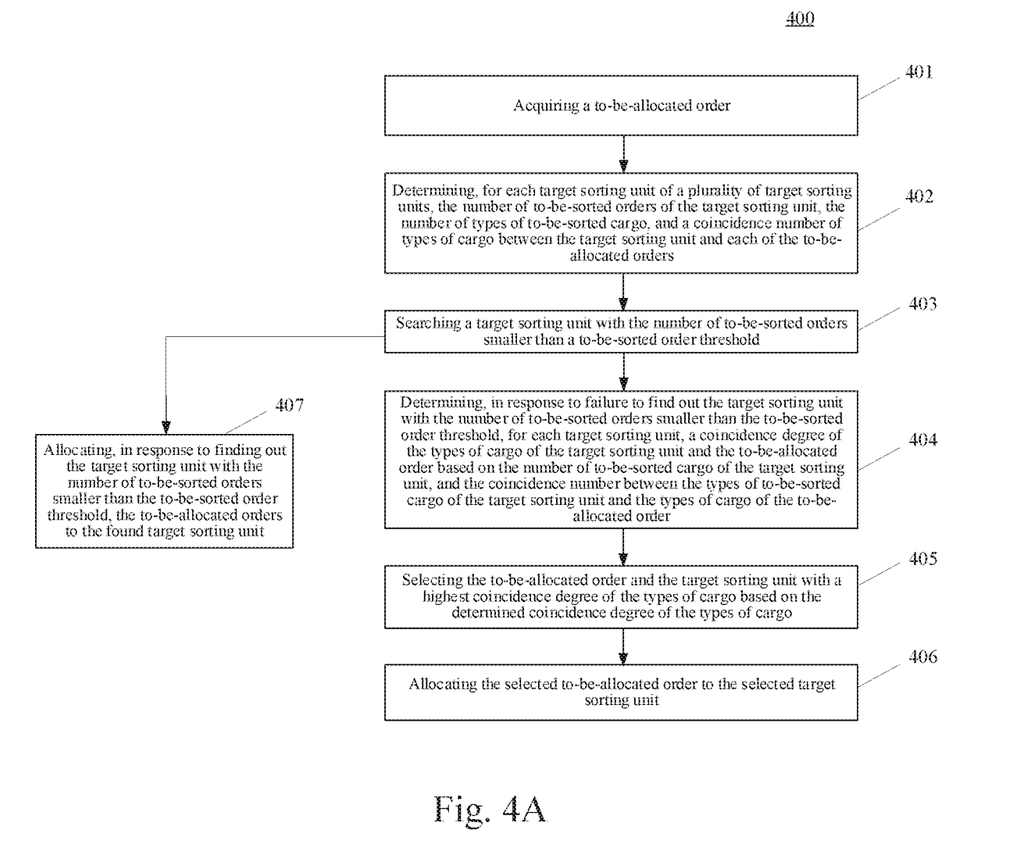
FIG. 4A is a flowchart of the method for sorting cargo according to another embodiment of the present disclosure.

Further referring to FIG. 4A, a process 400 of the method for sorting cargo of another embodiment is shown. The process 400 of the method for sorting cargo includes the following steps.

Step 401: acquiring an order form to be allocated.

In the present embodiment, an electronic device (e.g., the order allocation server shown in FIG. 1) on which the method for sorting cargo runs may acquire the order form to be allocated.

In the present embodiment, there may be a plurality of order forms to be allocated.

Step 402: determining, for each target sorting unit of a plurality of target sorting units, the number of order forms to be sorted of the target sorting unit, the number of types of cargo to be sorted, and a coincidence number of types of cargo between the types of cargo to be sorted of the target sorting unit and the types of cargo indicated by each of the order forms to be allocated.

In the present embodiment, the electronic device (e.g., the order allocation server shown in FIG. 1) on which the method for sorting cargo runs may determine, for each target sorting unit of the plurality of target sorting units: the number of order forms to be sorted of the target sorting unit, the number of types of cargo to be sorted, and the coincidence number of types of cargo between the target sorting unit and each of the order forms to be allocated.

In some alternative implementations of the present embodiment, the target sorting unit may be all sorting units in a warehouse.

In some alternative implementations of the present embodiment, the warehouse may be provided with a plurality of sorting units, the sorting units are provided with corresponding slots, the slots are configured to accommodate the cargo indicated by the order forms to be sorted allocated to the sorting units, and the sorting units may sort the cargo indicated by the order forms to be sorted from cargo shelves to the slots.

It will be appreciated that if the order sorting unit has bound the order form to be sorted to slot information, i.e., the cargo indicated by the order form to be sorted has been placed in the slot, or the cargo indicated by the order form to be sorted will be placed into the slot after being sorted out, then, the slot may be referred to as an occupied slot. The number of slots occupied in the warehouse may be determined for use as the number of occupied slots.

In some alternative implementations of the present embodiment, before the step 402, the target sorting unit may be selected from the sorting units of the warehouse by the following approach: determining an enabled number based on the number of slots corresponding to the sorting units, the number of occupied slots in the warehouse, and the number of order forms to be allocated; selecting the enabled number of sorting units from the plurality of sorting units; and determining the selected sorting units for use as the target sorting units.

As an example, the warehouse is provided with five sorting units, which are numbered as a sorting unit 1, a sorting unit 2, a sorting unit 3, a sorting unit 4, and a sorting unit 5 respectively. Each sorting unit corresponds to ten slots, three slots of which corresponding to each sorting unit are occupied slots. If the number of order forms to be allocated is twenty, then twenty unoccupied slots (idle slots) are required for computing. A sorting unit may be randomly selected, and if the number of idle slots is smaller than the number of order forms to be allocated, then a further sorting unit may be elected, until the total number of idle slots of the selected sorting units is not less than the number of the order forms to be allocated. The selected sorting units are determined for use as the target sorting units. Here, it is necessary to select three sorting units for use as the target sorting units.

In the present embodiment, for each order form to be allocated of the plurality of order forms to be allocated, the coincidence number of types of cargo between the types of cargo indicated by the order form to be allocated and the types of cargo to be sorted of each target sorting unit may be determined.

Step 403: searching a target sorting unit with the number of order forms to be sorted smaller than an order form to be sorted threshold.

In the present embodiment, the electronic device (e.g., the order allocation server shown in FIG. 1) on which the method for sorting cargo runs may search the target sorting unit with the number of order forms to be sorted smaller than the order form to be sorted threshold.

It should be noted that there may be two search results of step 403, one is failure to find out the target sorting unit with the number of order forms to be sorted smaller than the order form to be sorted threshold, and in this case, step 404, step 405, and step 406 will be executed; the other is finding out the target sorting unit with the number of order forms to be sorted smaller than the order form to be sorted threshold, and in this case, step 407 will be executed.

Step 404: determining, in response to failure to find out the target sorting unit with the number of order forms to be sorted smaller than the order form to be sorted threshold, for each target sorting unit, a coincidence degree of the types of cargo of the target sorting unit and the order form to be allocated based on the number of cargo to be sorted of the target sorting unit, and the coincidence number between the types of cargo to be sorted of the target sorting unit and the types of cargo of the order form to be allocated.

In the present embodiment, the electronic device (e.g., the order allocation server shown in FIG. 1) on which the method for sorting cargo runs may determine, in response to failure to find out the target sorting unit with the number of order forms to be sorted smaller than the order form to be sorted threshold, for each target sorting unit, the coincidence degree of the types of cargo of the target sorting unit and the order form to be allocated based on the number of types of cargo to be sorted of the target sorting unit, and the coincidence number between the types of cargo to be sorted of the target sorting unit and the types of cargo of the order form to be allocated.

In the present embodiment, for each order form to be allocated of the plurality of order forms to be allocated, a coincidence number of each type of cargo of the order form to be allocated and each target sorting unit may be determined; and for each target sorting unit of the plurality of target sorting units, the coincidence degree of the types of cargo of the target sorting unit and the order form to be allocated may be determined based on the number of types of cargo to be sorted of the target sorting unit, and the coincidence number between the types of cargo to be sorted of the target sorting unit and the types of cargo of the order form to be allocated.

As an example, the number of types of cargo of an order form to be allocated A is 4, the number of types of cargo of an order form to be allocated B is 5, the number of types of cargo to be sorted of an order form to be sorted of a target sorting unit C is 6, and the number of types of cargo of an order form to be sorted of a target sorting unit D is 8. A coincidence number of types of cargo of the order form to be allocated A and the target sorting unit C is 1, and a coincidence number of types of cargo of the order form to be allocated A and the target sorting unit D is 2. A coincidence number of types of cargo of the order form to be allocated B and the target sorting unit C is 3, and a coincidence number of types of cargo of the order form to be allocated B and the target sorting unit D is 4.

In some alternative implementations of the present embodiment, a ratio of the coincidence number of types of cargo to the number of types of cargo of the target sorting unit may be determined for use as the coincidence degree of the types of cargo.

In some alternative implementations of the present embodiment, a square of the number of types of cargo to be sorted of the target sorting unit may be first computed, and then a ratio of the coincidence number of types of cargo to the square is determined for use as the coincidence degree of the types of cargo. It should be noted that this approach of computing the square for the number of types of cargo to be sorted may amplify a difference in a radix of cargo to be sorted by the target sorting unit, and may improve the sorting efficiency compared with an approach without computing the square.

As an example, assuming that the number of types of cargo to be sorted of the target sorting unit A is 3, and the number of types of cargo to be sorted of the target sorting unit B is 6, a coincidence number of types of cargo of the order form to be allocated C and the target sorting unit A is 1, and a coincidence number of types of cargo of the order form to be allocated C and the target sorting unit B is 2.

As an example, a ratio of the coincidence number of types of cargo 1 to the number of types of cargo to be sorted 3 may be determined for use as a coincidence degree of the types of cargo between the order form to be allocated C and the target sorting unit A, i.e., 1/3. A ratio of the coincidence number of types of cargo 2 to the number of types of cargo to be sorted 6 may be determined for use as a coincidence degree of the types of cargo between the order form to be allocated C and the target sorting unit B, i.e., also 1/3. In this case, the ratio is equal. However, the number of types of cargo to be sorted of the target sorting unit A is less, and a sorting task can be completed after sorting a few types, while the number of types of cargo to be sorted of the target sorting unit B is more, and a sorting task can be completed only after sorting many types. In comparison, if the approach of first computing the square of the number of types of cargo to be sorted of the target sorting unit is used, then the coincidence degree of the types of cargo between the order form to be allocated C and the target sorting unit A is 1/9, and the coincidence degree of the types of cargo between the order form to be allocated C and the target sorting unit B is 1/18, thereby selecting a target sorting unit of a higher execution efficiency.

In some alternative implementations of the present embodiment, a target sorting unit with a maximum coincidence degree of the types of cargo of the order form to be allocated may be selected. Then, the order form to be allocated is allocated to a target sorting unit with a highest coincidence degree between the order form to be allocated and said target sorting unit.

Step 405: selecting the order form to be allocated and the target sorting unit with a highest coincidence degree of the types of cargo based on the determined coincidence degree of the types of cargo.

In the present embodiment, the electronic device (e.g., the order allocation server of the order form to be allocated shown in FIG. 1) on which the method for sorting cargo runs may select the order form to be allocated and the target sorting unit with the highest coincidence degree of the types of cargo based on the determined coincidence degree of the types of cargo.

Figure 4B:
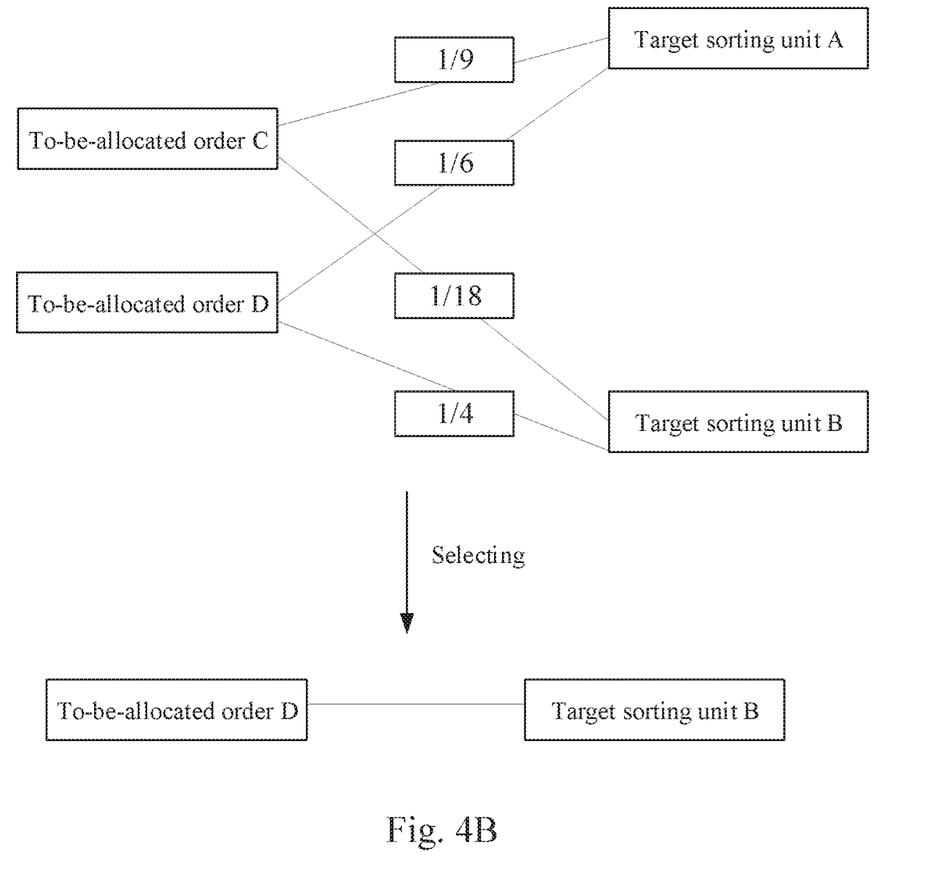
FIG. 4B is a schematic diagram of an example of step 405.

As an example, as shown in FIG. 4B, FIG. 4B is a schematic diagram of an example of step 405. The coincidence degree of the types of cargo between the order form to be allocated C and the target sorting unit A is 1/9, and the coincidence degree of the types of cargo of the order form to be allocated C and the target sorting unit B is 1/18; a coincidence degree of the types of cargo of the order form to be allocated D and the target sorting unit A is 1/6, and a coincidence degree of the types of cargo between the order form to be allocated D and the target sorting unit B is 1/4. Therefore, the order form to be allocated and the target sorting unit with the highest coincidence degree are the order form to be allocated D and the target sorting unit B.

It should be noted that after the order form to be allocated and the target sorting unit with the highest coincidence degree are selected for allocation, coincidence degrees of the types of cargo between all target sorting units and other unallocated order forms to be allocated will change, and one-to-one allocation may improve the accuracy of each allocation.

Step 406: allocating the selected order form to be allocated to the selected target sorting unit.

In the present embodiment, the electronic device (e.g., the order allocation server shown in FIG. 1) on which the method for sorting cargo runs may allocate the selected order form to be allocated to the selected target sorting unit, such that the selected target sorting unit sorts out the cargo indicated by the selected order form to be allocated.

As an example, in the example of step 405, the order form to be allocated C may be allocated to the target sorting unit B, and the target sorting unit B sorts the cargo indicated by the order form to be allocated C, such that the target sorting unit B sorts the cargo indicated by the order form to be allocated C.

Step 407: allocating, in response to finding out the target sorting unit with the number of order forms to be sorted smaller than the order form to be sorted threshold, the order forms to be allocated to the found target sorting unit.

In the present embodiment, the electronic device (e.g., the order allocation server shown in FIG. 1) on which the method for sorting cargo runs may allocate, in response to finding out the target sorting unit with the number of order forms to be sorted smaller than the order form to be sorted threshold, the order forms to be allocated to the found target sorting unit.

As an example, three target sorting units are numbered as a target sorting unit 1, a target sorting unit 2, and a target sorting unit 3 respectively. The order form to be sorted threshold is 3, the number of order forms to be sorted of the target sorting unit 1 is 4, the number of order forms to be sorted of the target sorting unit 2 is 2, and the number of order forms to be sorted of the target sorting unit 3 is 5. Then, the order form to be allocated may be allocated to the target sorting unit 2 with the number of order forms to be sorted smaller than the order form to be sorted threshold. It will be appreciated that prior to computing the coincidence degree of the types of cargo, the order form to be allocated is allocated to a target sorting unit with a smaller number of order forms to be sorted, thereby reducing the computing workload whilst improving the overall sorting efficiency.

As can be seen from FIG. 4A, compared with the corresponding embodiment of FIG. 2, the process 400 of the method for sorting cargo in the present embodiment highlights the step of selecting the order form to be allocated and the target sorting unit with the highest coincidence degree of the types of cargo. Therefore, the solution described in the present embodiment may further improve the cargo sorting efficiency.

Figure 5:
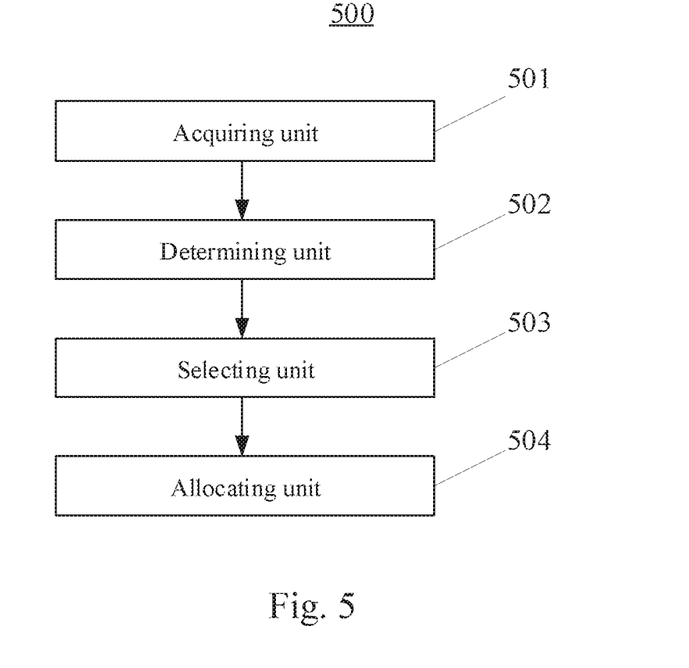
FIG. 5 is a schematic structural diagram of an apparatus for sorting cargo according to an embodiment of the present disclosure.

Further referring to FIG. 5, as an implementation of the method shown in the above figures, an embodiment of the present disclosure provides an apparatus for sorting cargo. The embodiment of the apparatus corresponds to the embodiment of the method shown in FIG. 2, and the apparatus may be specifically applied to various electronic devices.

As shown in FIG. 5, the apparatus 500 for sorting cargo of the present embodiment includes: an acquiring unit 501, a determining unit 502, a selecting unit 503, and an allocating unit 504. The acquiring unit is configured to acquire an order form to be allocated; the determining unit is configured to determine at least one of the following items, for each target sorting unit of a plurality of target sorting units: the number of order forms to be sorted of the target sorting unit, the number of types of cargo to be sorted, or a coincidence number of types of cargo between the target sorting unit and the order form to be allocated, the coincidence number of types of cargo being a number of same types of cargo between the types of cargo indicated by the order form to be allocated and the types of cargo to be sorted of the target sorting unit; the selecting unit is configured to select a target sorting unit based on at least one of the following items of each target sorting unit: the number of order forms to be sorted, the number of types of cargo to be sorted, or the coincidence number of types of cargo; and the allocating unit is configured to allocate the order form to be allocated to the selected target sorting unit, such that the selected target sorting unit sorts out the cargo indicated by the order form to be allocated.

The specific processing of the acquiring unit 501, the determining unit 502, the selecting unit 503, and the allocating unit 504 and the technical effects thereof in the present embodiment may refer to the related description of step 201, step 202, step 203, and step 204 in the corresponding embodiment of FIG. 2, respectively. The description will not be repeated here.

In some alternative implementations of the present embodiment, the selecting unit is further configured to: search a target sorting unit with a number of order forms to be sorted smaller than an order form to be sorted threshold; and determine, in response to failure to find out the target sorting unit with the number of order forms to be sorted smaller than the order form to be sorted threshold, for each target sorting unit, a coincidence degree of the types of cargo of the target sorting unit and the order form to be allocated based on the number of types of cargo to be sorted of the target sorting unit, and the coincidence number between the types of cargo to be sorted of the target sorting unit and the types of cargo of the order form to be allocated.

In some alternative implementations of the present embodiment, the selecting unit may be further configured to: select a target sorting unit with a maximum coincidence degree of the types of cargo of the order form to be allocated.

In some alternative implementations of the present embodiment, the order form to be allocated includes a plurality of order forms to be allocated; and the selecting unit is further configured to: determine, for each order form to be allocated of the plurality of order forms to be allocated, a coincidence number of each type of cargo of the order form to be allocated and each target sorting unit; and determine, for each target sorting unit of the plurality of target sorting units, the coincidence degree of the types of cargo of the target sorting unit and the order form to be allocated based on the number of types of cargo to be sorted of the target sorting unit, and the coincidence number between the types of cargo to be sorted of the target sorting unit and the types of cargo of the order form to be allocated.

In some alternative implementations of the present embodiment, the selecting unit is further configured to: select the order form to be allocated and the target sorting unit with a highest coincidence degree of the types of cargo based on the determined coincidence degree of the types of cargo; and the allocating unit is further configured to: allocate the selected order form to be allocated to the selected target sorting unit, such that the selected target sorting unit sorts out cargo indicated by the selected order form to be allocated.

In some alternative implementations of the present embodiment, the selecting unit is further configured to: allocate, in response to finding out the target sorting unit with the number of order forms to be sorted smaller than the order form to be sorted threshold, the order forms to be allocated to the found target sorting unit.

In some alternative implementations of the present embodiment, the warehouse is provided with a plurality of sorting units, the sorting units are provided with corresponding slots, the slots are configured to accommodate the cargo indicated by the to-be-sorted orders allocated to the sorting units, and the apparatus further includes an enabling unit (not shown in the figure) configured to: determine an enabled number based on the number of slots corresponding to the sorting units, the number of occupied slots in the warehouse, and the number of to-be-allocated orders; select the enabled number of sorting units from the plurality of sorting units; and determine the selected sorting units for use as the target sorting units.

In some alternative implementations of the present embodiment, the acquiring unit is further configured to: acquire to-be-processed order information of a to-be-processed order, the to-be-processed order information including priority information and time information; and determine whether to determine the to-be-processed order for use as the order form to be allocated based on the priority information, and whether a time interval between time indicated by the time information and current time is greater than a preset duration threshold.

It should be noted that the implementation details and technical effects of the units in the apparatus for sorting cargo provided by the present embodiment may be refer to the description of other embodiments in the present disclosure. The description will not be repeated here.

Figure 6:
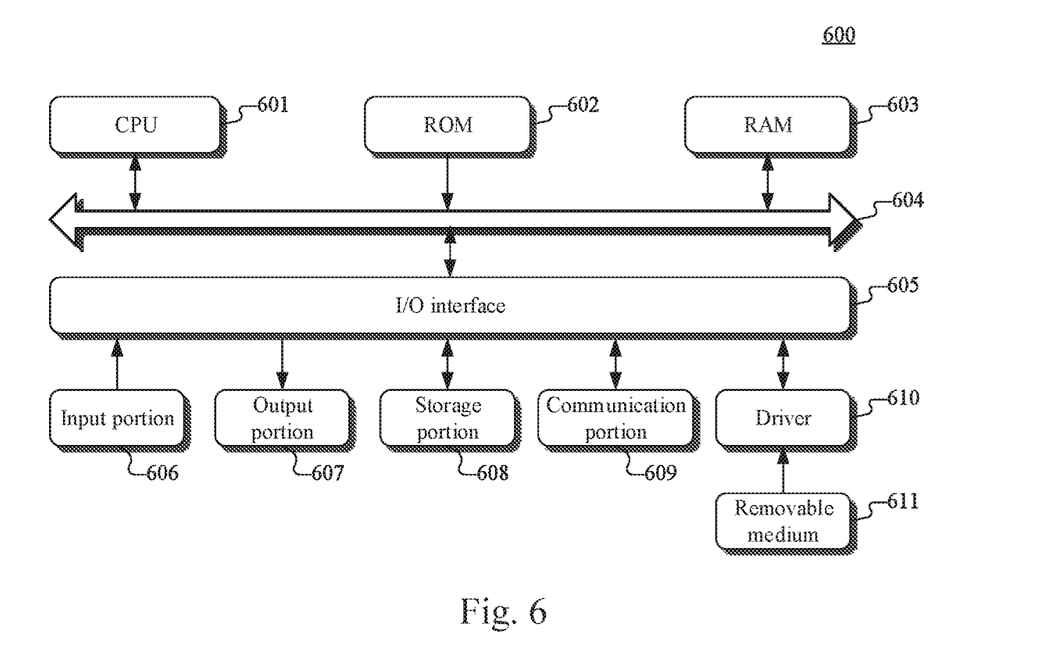
FIG. 6 is a schematic structural diagram of a computer system adapted to implement an electronic device of embodiments of the present disclosure.

With reference to FIG. 6, a schematic structural diagram of a computer system 600 adapted to implement an electronic device of an embodiments of the present disclosure is shown. The electronic device shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above-mentioned functionalities as defined by the method of the present disclosure.

It should be noted that the computer readable medium in the present disclosure may be computer readable signal medium or computer readable storage medium or any combination of the above two. The computer readable storage medium may, for example, include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in some embodiments of the present disclosure may be implemented by software or hardware. The described units may also be provided in a processor, for example, described as: a processor including an acquiring unit, a determining unit, a selecting unit, and an allocating unit. The names of the units do not constitute a limitation to such units themselves in some cases. For example, the acquiring unit may be further described as "a unit configured to acquire an order form to be allocated."

In another aspect, an embodiment of the present disclosure further provides a computer readable medium. The computer readable medium may be included in the apparatus described in the above embodiments, or a stand-alone computer readable medium without being assembled into the apparatus. The computer readable medium stores one or more programs. The one or more programs, when executed by the apparatus, cause the apparatus to: acquire an order form to be allocated; determine, for each target sorting unit of a plurality of target sorting units, at least one of the following items: the number of order forms to be sorted of the target sorting unit, the number of types of cargo to be sorted, or a coincidence number of types of cargo between the types of cargo to be sorted of target sorting unit and the types of cargo indicated by the order form to be allocated, the coincidence number of types of cargo being the number of same types of cargo between cargo indicated by the order form to be allocated and the cargo to be sorted of the target sorting unit; select a target sorting unit based on at least one of the following items of each target sorting unit: the number of order forms to be sorted, the number of types of cargo to be sorted, or the coincidence number of types of cargo; and allocate the order form to be allocated to the selected target sorting unit, such that the selected target sorting unit sorts out the cargo indicated by the order form to be allocated.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:
1. A method for sorting cargo, comprising:
 acquiring an order form to be allocated to a target sorting unit;
 determining, for each target sorting unit of a plurality of target sorting units: a quantity of order forms to be sorted by the target sorting unit, a quantity of types of cargo to be sorted by the target sorting unit, and a coincidence number of types of cargo between the types of cargo to be sorted by the target sorting unit and types of cargo indicated by the order form to be allocated, the coincidence number of types of cargo being a quantity of the types of cargo to be sorted by the target sorting unit that match the types of cargo indicated by the order form to be allocated;
selecting a target sorting unit based on at least one of: the quantity of order forms to be sorted, the quantity of types of cargo to be sorted, or the coincidence number of types of cargo; and
allocating the order form to be allocated to the selected target sorting unit, such that the selected target sorting unit sorts out the cargo indicated by the order form to be allocated.

2. The method according to claim 1, wherein selecting the target sorting unit further comprises:
searching a target sorting unit with a quantity of order forms to be sorted smaller than a to-be-sorted order form threshold; and
determining, in response to failure to find out the target sorting unit with the quantity of order forms to be sorted smaller than the to-be-sorted order form threshold, for each target sorting unit, a coincidence degree of the types of cargo between the types of cargo to be sorted by the target sorting unit and the types of cargo indicated by the order form to be allocated based on the quantity of types of cargo to be sorted by the target sorting unit, and the coincidence number of types of cargo between the types of cargo to be sorted by the target sorting unit and the types of cargo indicated by the order form to be allocated, wherein the coincidence degree of the types of cargo refers to a ratio of the coincidence number of types of cargo to the quantity of types of cargo to be sorted by the target sorting unit, or a ratio of the coincidence number of types of cargo to a square of the quantity of types of cargo to be sorted by the target sorting unit.

3. The method according to claim 2, wherein selecting the target sorting unit further comprises:
selecting a target sorting unit with a highest coincidence degree of the types of cargo.

4. The method according to claim 3, wherein a quantity of the order form to be allocated is more than one; and
determining the coincidence degree of the types of cargo between the types of cargo to be sorted by the target sorting unit and the types of cargo indicated by the order form to be allocated comprises:
determining, for each order form to be allocated of a plurality of order forms to be allocated, a coincidence number of type of cargo between each type of cargo indicated by the order form to be allocated and each type of cargo to be sorted by each target sorting unit; and determining, for each target sorting unit of the plurality of target sorting units, the coincidence degree of the types of cargo between the types of cargo to be sorted by the target sorting unit and the types of cargo indicated by the order form to be allocated based on the quantity of types of cargo to be sorted by the target sorting unit, and the coincidence number of types of cargo between the types of cargo to be sorted by the target sorting unit and the types of cargo indicated by the order form to be allocated.

5. The method according to claim 4, wherein selecting the target sorting unit with the highest coincidence degree of the types of cargo comprises:
selecting the order form to be allocated and the target sorting unit that have the highest coincidence degree of the types of cargo based on the determined coincidence degree of the types of cargo; and
allocating the order form to be allocated to the selected target sorting unit comprises:
allocating the selected order form to be allocated to the selected target sorting unit, such that the selected target sorting unit sorts out cargo indicated by the selected order form to be allocated.

6. The method according to claim 2, wherein selecting the target sorting unit further comprises:
allocating, in response to finding out the target sorting unit with the quantity of order forms to be sorted smaller than the to-be-sorted order form threshold, the order forms to be allocated to the found target sorting unit.

7. The method according to claim 6, wherein a warehouse is provided with a plurality of sorting units, the sorting units are provided with corresponding slots, the slots are configured to accommodate the cargo indicated by the order forms to be sorted and allocated to the sorting units, and the method further comprises:
determining a target number based on a quantity of slots corresponding to the sorting units, a quantity of occupied slots in the warehouse, and a quantity of order forms to be allocated;
selecting the target number of sorting units from the plurality of sorting units; and
determining the selected sorting units for use as the target sorting units.

8. The method according to claim 7, wherein the acquiring the order form to be allocated comprises:
acquiring order information of an order form to be processed, wherein the order information comprises priority information and time an order is placed or received; and
determining whether to determine the order form to be processed for use as the order form to be allocated based on the priority information, and whether a time interval between the time the order was placed or received and current time is greater than a preset duration threshold.

9. A non-transitory computer readable storage medium, storing a computer program thereon, wherein the program, when executed by a processor, implements the method according to claim 1.

10. An apparatus for sorting cargo, comprising:
at least one processor; and
a memory storing instructions, wherein the instructions when executed by the at least one processor, cause the at least one processor to perform operations, the operations comprising:
acquiring an order form to be allocated to a target sorting unit;
determining, for each target sorting unit of a plurality of target sorting units: a quantity of order forms to be sorted by the target sorting unit, a quantity of types of cargo to be sorted by the target sorting unit, or a coincidence number of types of cargo between the types of cargo to be sorted by target sorting unit and types of cargo indicated by the order form to be allocated, the coincidence number of types of cargo being a quantity of the types of cargo to be sorted by the target sorting unit that match the types of cargo indicated by the order form to be allocated;
selecting a target sorting unit based on at least one of: the quantity of order forms to be sorted, the quantity of types of cargo to be sorted, or the coincidence number of types of cargo; and
allocating the order form to be allocated to the selected target sorting unit, such that the selected target sorting unit sorts out the cargo indicated by the order form to be allocated.

11. The apparatus according to claim 10, wherein selecting the target sorting unit further comprises:
   searching a target sorting unit with a quantity of order forms to be sorted smaller than a to-be-sorted order form threshold; and
   determining, in response to failure to find out the target sorting unit with the quantity of order forms to be sorted smaller than the to-be-sorted order form threshold, for each target sorting unit, a coincidence degree of the types of cargo between the types of cargo to be sorted by the target sorting unit and the types of cargo indicated by the order form to be allocated based on the quantity of types of cargo to be sorted, and the coincidence number of types of cargo between the types of cargo to be sorted by the target sorting unit and the types of cargo indicated by the order form to be allocated.

12. The apparatus according to claim 11, wherein selecting the target sorting unit further comprises:
   selecting a target sorting unit with a highest coincidence degree of the types of cargo.

13. The apparatus according to claim 12, wherein a quantity of the order form to be allocated is more than one; and determining the coincidence degree of the types of cargo between the types of cargo to be sorted by the target sorting unit and the types of cargo indicated by the order form to be allocated comprises:
   determining, for each order form to be allocated of a plurality of order forms to be allocated, a coincidence number of type of cargo between each type of cargo indicated by the order form to be allocated and each type of cargo to be sorted by each target sorting unit; and determining, for each target sorting unit of the plurality of target sorting units, the coincidence degree of the types of cargo between the types of cargo to be sorted by the target sorting unit and the types of cargo indicated by the order form to be allocated based on the quantity of types of cargo to be sorted by the target sorting unit, and the coincidence number of types of cargo between the types of cargo to be sorted by the target sorting unit and the types of cargo indicated by the order form to be allocated, wherein the coincidence degree of the types of cargo refers to a ratio of the coincidence number of types of cargo to the quantity of types of cargo to be sorted by the target sorting unit, or a ratio of the coincidence number of types of cargo to a square of the quantity of types of cargo to be sorted by the target sorting unit.

14. The apparatus according to claim 13, wherein selecting the target sorting unit with the highest coincidence degree of the types of cargo comprises:
   selecting the order form to be allocated and the target sorting unit that have the highest coincidence degree of the types of cargo based on the determined coincidence degree of the types of cargo; and
   allocating the order form to be allocated to the selected target sorting unit comprises:
   allocating the selected order form to be allocated to the selected target sorting unit, such that the selected target sorting unit sorts out cargo indicated by the selected order form to be allocated.

15. The apparatus according to claim 11, wherein selecting the target sorting unit further comprises:
   allocating, in response to finding out the target sorting unit with the quantity of order forms to be sorted smaller than the to-be-sorted order form threshold, the order forms to be allocated to the found target sorting unit.

16. The apparatus according to claim 15, wherein a warehouse is provided with a plurality of sorting units, the sorting units are provided with corresponding slots, the slots are configured to accommodate the cargo indicated by the order forms to be sorted and allocated to the sorting units, and the operations further comprise:
   determining a target number based on a quantity of slots corresponding to the sorting units, a quantity of occupied slots in the warehouse, and a quantity of order forms to be allocated;
   selecting the target number of sorting units from the plurality of sorting units; and
   determining the selected sorting units for use as the target sorting units.

17. The apparatus according to claim 16, wherein acquiring the order form to be allocated comprises:
   acquiring order information of an order form to be processed, wherein the order information comprises priority information and time an order is placed or received; and
   determining whether to determine the order form to be processed for use as the order form to be allocated based on the priority information, and whether a time interval between the time the order was placed or received and current time is greater than a preset duration threshold.

* * * * *